United States Patent
Daniell et al.

(10) Patent No.: US 7,065,644 B2
(45) Date of Patent: Jun. 20, 2006

(54) SYSTEM AND METHOD FOR PROTECTING A SECURITY PROFILE OF A COMPUTER SYSTEM

(75) Inventors: William T. Daniell, Marietta, GA (US);
Brian K. Daigle, Marietta, GA (US);
Gary Sevounts, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 09/759,932

(22) Filed: Jan. 12, 2001

(65) Prior Publication Data
US 2002/0095591 A1    Jul. 18, 2002

(51) Int. Cl.
*G06F 11/00* (2006.01)

(52) U.S. Cl. ............... 713/166; 713/164; 713/166; 713/167; 713/187; 726/2; 726/3; 726/14

(58) Field of Classification Search ............... 713/164, 713/166, 167, 201, 187; 726/2, 3, 14
See application file for complete search history.

(56) References Cited

U.S. PATENT DOCUMENTS

| | | | | |
|---|---|---|---|---|
| 4,956,769 A | * | 9/1990 | Smith | 707/9 |
| 4,984,272 A | * | 1/1991 | McIlroy et al. | 726/17 |
| 5,032,979 A | * | 7/1991 | Hecht et al. | 713/201 |
| 5,809,230 A | * | 9/1998 | Pereira | 713/200 |
| 5,819,226 A | * | 10/1998 | Gopinathan et al. | 705/44 |
| 5,974,149 A | * | 10/1999 | Leppek | 713/164 |
| 5,991,791 A | | 11/1999 | Siefert | 709/100 |
| 6,055,636 A | * | 4/2000 | Hillier et al. | 713/200 |
| 6,125,457 A | | 9/2000 | Crisan et al. | 714/36 |
| 6,154,844 A | | 11/2000 | Touboul et al. | 713/201 |
| 6,158,010 A | | 12/2000 | Moriconi et al. | 713/201 |
| 6,249,868 B1 | * | 6/2001 | Sherman et al. | 713/168 |
| 6,321,334 B1 | * | 11/2001 | Jerger et al. | 713/200 |
| 6,324,578 B1 | * | 11/2001 | Cox et al. | 709/223 |
| 6,339,826 B1 | * | 1/2002 | Hayes et al. | 713/166 |
| 6,473,800 B1 | * | 10/2002 | Jerger et al. | 709/226 |
| 6,510,466 B1 | * | 1/2003 | Cox et al. | 709/229 |
| 6,530,024 B1 | * | 3/2003 | Proctor | 713/201 |
| 6,587,876 B1 | * | 7/2003 | Mahon et al. | 709/223 |

FOREIGN PATENT DOCUMENTS

JP          2001034379 A    *   2/2001

* cited by examiner

*Primary Examiner*—Christopher Revak
*Assistant Examiner*—Taghi T. Arani (57) ABSTRACT

A security application protects a security profile of a computer system by detecting security settings of the computer system have changed. In this regard, the security application activates the computer system's security profile by controlling the security settings of the computer system based on user inputs. The security application then periodically monitors the security settings to ensure that none of the settings have changed since activation. If any of the security settings have changed, the security application automatically modifies the security settings in order to return the changed settings to their activation state. The security application then transmits a message to one or more users to alert the users of the detected change in the security settings.

24 Claims, 3 Drawing Sheets

SYSTEM AND METHOD FOR PROTECTING A SECURITY PROFILE OF A COMPUTER SYSTEM

BACKGROUND OF THE INVENTION

1. Field of the Invention

The present invention generally relates to computer resource security and, in particular, to a system and method for automatically monitoring a security profile of a computer system and for correcting the security profile in order to maintain a desired level of security.

2. Related Art

To protect a computer system against vulnerabilities (e.g., attacks from hackers), the computer system is often "locked down" via a security application. As known in the art, a security application locks down a computer system by controlling a machine state or configuration of the computer system such that the computer system (e.g., an operating system within the computer system) enforces a set of security rules that prevent unauthorized users from accessing and/or modifying certain applications, files, and/or other resources within the computer system. For example, a security application may set the configuration of the computer system such that the computer system enforces a rule that restricts which users may access a particular file. In this regard, the computer system may maintain a list, commonly referred to as an access control list, that identifies which users are authorized to access and/or use various computer resources. To cause the computer system to enforce the foregoing rule, the security application modifies the access control list such that it indicates which users may access the particular file. When a user attempts to access this file, the computer system first checks the access control list to determine whether or not the user is one of the specified users that may access the file. If the user is one of the specified users, then the computer system allows the access to occur. However, if the user is not one of the specified users, then the computer system prevents the access and displays a message to the user indicating that access to the requested file has been denied.

The security application normally includes data that defines a list of security rules that may be enforced by a computer system. The security application displays this list of security rules and allows a particular user or set of users, referred to herein as the "system administrator," to select which of the rules that the system administrator would like enforced by the computer system. The security application, in turn, modifies the configuration or, in other words, the machine state of the computer system such that the computer system enforces the rules selected by the system administrator.

Note that the security application normally sets the security configuration (i.e., the portions of the machine state pertaining to system security) of the computer system, and the computer's operating system enforces the security rules based on the settings controlled by the security application. In other words, the security application causes the operating system to enforce the selected rules by manipulating the security configuration of the computer system. Thus, once the security application has set the security configuration of the computer system, the security application usually provides no further functionality in enforcing the selected rules. The security application, however, may change the computer system's settings in order to change which rules are enforced by the operating system in response to inputs for changing the security profile from the system administrator.

As described above, the system administrator selects which security rules should be enforced based on the level of security desired by the administrator, and the degree to which the computer system is locked down by the security application depends on the rules selected by the system administrator. Generally, the more rules that are enforced, the more secure the system becomes and, in other words, the more the system is locked down. Thus, if the system administrator desires to have a more secure computer system, the system administrator typically selects more rules for enforcement and/or selects particular rules that provide a particularly secure environment in an area of interest to the system administrator. However, in general, the compatibility of the computer system decreases as the security of the computer system increases. Therefore, if security is not a high priority to the system administrator, then he or she may select for enforcement fewer rules and/or rules that do not provide a high level of security, thereby reducing the degree to which the computer system is locked down.

Moreover, the degree to which the computer system is locked down by the security application depends on the competing interests of system security and system compatibility. Therefore, the rules selected for enforcement usually vary from computer system to computer system based on the desires of the system administrators in establishing the security profile of each of the computer systems. As used herein, a "security profile" refers to the collective set of rules that have been selected for locking down a computer system in order to prevent unauthorized users from accessing and/or modifying certain resources within the computer system. Security applications that set the security configuration of a computer system to induce the computer system to enforce the selected security rules or that, in other words, set the security profiles of computer systems are well known in the art and are often referred to as "lock down products" or "lock down applications." Normally, a security application only allows the system administrator or a user designated by the system administrator to change the computer system's security profile.

Since the security profiles of computer systems typically vary from computer system to computer system, most security applications do not provide a standard set of security rules for implementation. In this regard, most security applications list for the system administrator each security rule that may be selected for enforcement. The system administrator then reviews the displayed list of rules and selects the rules that the administrator would like enforced by the computer system and, in other words, added to the security profile of the computer system. When a rule is selected for enforcement, the rule is referred to herein as "enabled," and when a rule is not selected for enforcement, the rule is referred to herein as "disabled."

After the system administrator has traversed through the list and has enabled or disabled each of the rules as desired, the system administrator enters an input to activate the security profile being defined by the system administrator. Upon activation, the security application modifies the security configuration of the computer system such that the rules enabled at the time of activation are now enforced by the computer system and such that the rules disabled at the time of activation are now not enforced by the computer system. In other words, the security application causes the computer system to implement the security profile defined by the system administrator.

As described above, after activation, the security application is not typically involved in the enforcement of the selected rules until the security application receives inputs for changing the security profile being implemented by the computer system. In this regard, the security profile is defined by the settings or, in other words, the machine state of the computer system, and the computer system utilizes theses settings in enforcing the selected rules of the security profile. However, it is possible, in some instances, for an unauthorized user to change the settings of the computer system such that the security profile implemented at the time of activation is changed. In other words, it is possible for an unauthorized user to change these settings of the computer system such that the computer system enforces a different set of security rules. As a result, the security of the computer system may be compromised, and/or the compatibility of the computer system may be reduced.

Thus, a heretofore unaddressed need exists in the industry for providing a system and method of protecting a security profile of a computer system from changes made by unauthorized users.

SUMMARY OF THE INVENTION

The present invention overcomes the inadequacies and deficiencies of the prior art as discussed hereinbefore. Generally, the present invention provides a system and method for detecting when an unauthorized user has made a change to a security profile and for returning the security profile to its original state.

In architecture, the system of the present invention utilizes memory and a security application. The security application displays a list of security rules that pertain to the security of a computer system. The security application enables ones of the security rules based on inputs from a user of the computer system. In response to a request for activating a security profile, the security application modifies security settings within the computer system such that the computer system enforces the rules that were enabled when the activation request was received by the computer system. The security application then stores, in the memory, data indicative of the modified security settings. Subsequently, the security application periodically performs comparisons between the stored data and the security settings in order to determine when one of the security settings has changed from a first value to another value. When the security application determines that one of the security settings has so changed, the security application automatically changes the one security setting back to the first value. As a result, the security application automatically corrects for unauthorized changes made to the security settings.

In accordance with another feature of the present invention, the security application automatically transmits a message when it determines that one of the security settings has changed. Therefore, the user that receives the message is aware that an unauthorized attempt to change the security profile of the computer system has been made.

The present invention can also be viewed as providing a method for locking down resources of a computer system. The method can be broadly conceptualized by the following steps: receiving a request for activating a security profile; modifying security settings of a computer system in response to the request; storing data indicative of the security settings, as modified by the modifying step; automatically determining when one of the security settings has changed from a first value to another value by periodically comparing the data to the security settings; and automatically changing the one security setting to the first value in response to a determination in the determining step that the one security setting has changed.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

In general, the present invention relates to a system and method for protecting a security profile of a computer system. In this regard, a security application activates a security profile by setting the security configuration of a computer system (i.e., the settings of a computer system that pertain to the system's security) based on user inputs. The security application then periodically monitors the security configuration to ensure that none of its settings have changed since activation. If the security configuration has changed, the security application preferably modifies the security configuration in order to return the security configuration to its activation state. The security application then transmits a message to one or more users to alert the users of the detected change in the security configuration.

Figure 1:
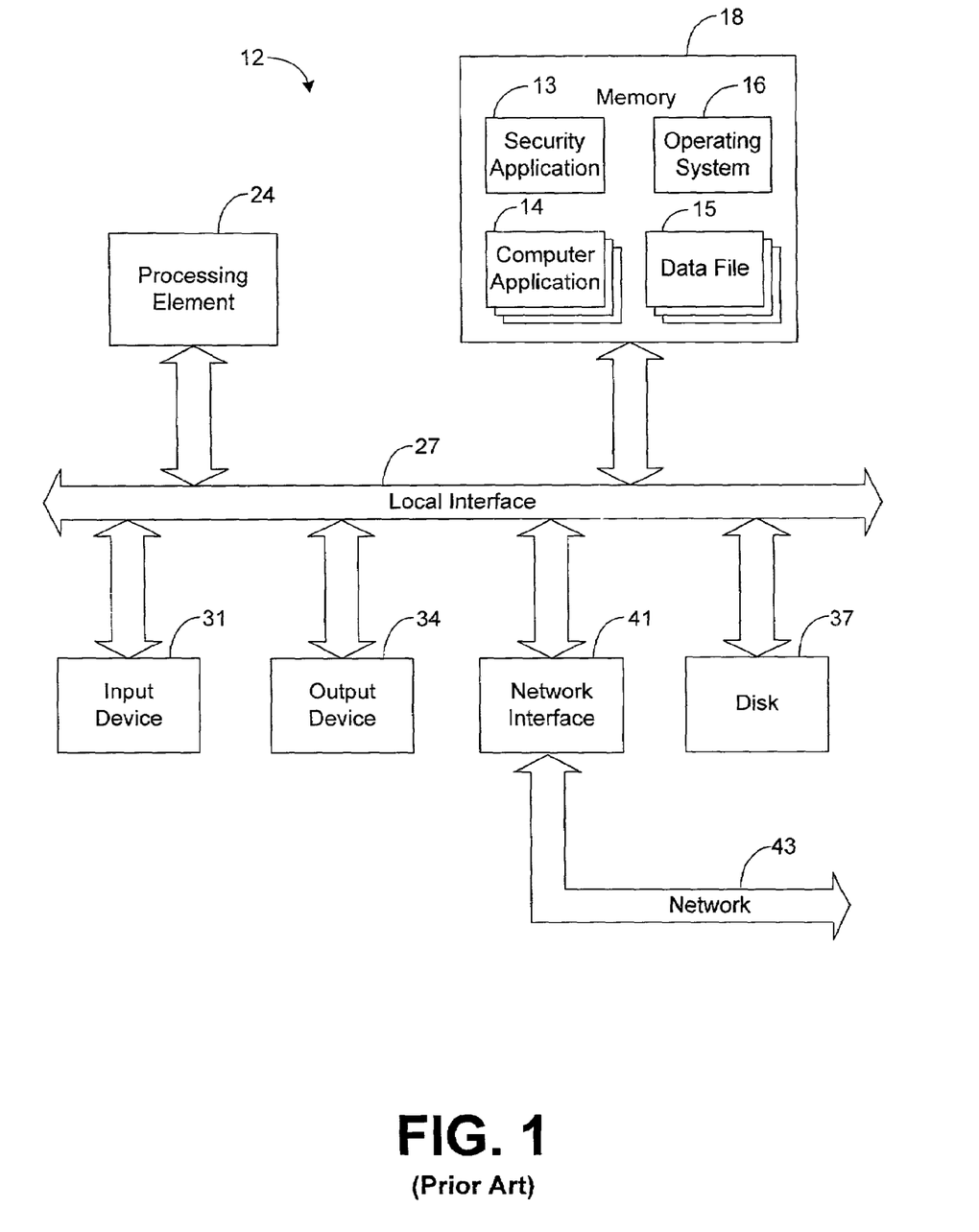
FIG. 1 is a block diagram illustrating a computer system employing a conventional security application.

FIG. 1 depicts a computer system 12 that employs a security application 13 of the prior art. The computer system 12 includes various computer applications 14, data files 15, and an operating system 16 stored in memory 18. The computer applications 14 may comprise any known computer applications for performing any programmed functionality when executed by the computer system 12. Windows NT, Microsoft Outlook, and Microsoft BackOffice are all examples of conventional computer applications that may comprise the computer applications 14 shown by FIG. 1. The operating system 16, via well-known techniques, is configured to control the operation and resources of the computer system 12. A primary function of the operating system 16 is to control when the instructions of applications 13 and 14 are executed by controlling when these instructions are interfaced with a processing element 24, such as a digital signal processor (DSP) or a central processing unit (CPU), for example.

Through well-known techniques, the processing element 24 is configured to execute the instructions transmitted to it. In executing these commands, the processing element 24 may communicate to and drive the other elements within the system 12 via a local interface 27, which can include one or more buses. Furthermore, an input device 31, for example, a keyboard or a mouse, can be used to input data from a user of the system 12, and an output device 34, such as a screen display or a printer, can be used to output data to the user. A disk storage mechanism 37 can be connected to the local interface 27 to transfer data to and from a nonvolatile disk (e.g., magnetic, optical, etc.). The system 12 can be connected to a network interface 41 that allows the system 12 to exchange data with a network 43.

The security application 13 includes data that defines a list of security rules for preventing unauthorized access and/or modification of certain applications 14, files 15, and/or other resources within the computer system 12. In other words, the security application 13 includes data that defines a list of security rules for locking down the computer system 12. For example, one of the rules, when enforced, may prevent a certain class of user from accessing a particular application 14. Other examples of rules typically included in lists defined by conventional security applications 13 for locking down a computer system 12 are well-known in the art and will not be described in detail herein.

When invoked for the first time, the security application 13 normally provides a list of options, via output device 34, to the user of the system 12. This user is normally considered to be a system administrator (i.e., a user authorized to set and/or change the security profile of the system 12). One of the displayed options is to enable selection of a new security profile to be implemented by the security application 13. Upon selection of this option, the security application 13 is configured to display to the system administrator, via output device 34, a list of the security rules defined by the data within the security application 13. The system administrator may analyze these rules and select the rules that he or she would like to have enforced. Note that one of the rules usually selected is to allow only a certain class of user to modify the security profile. Therefore, only the system administrator and/or users designated by the system administrator may normally make changes to the selected security profile once the security profile is activated.

After each desired rule has been selected, the system administrator preferably inputs, via input device 31, a request for activating the selected profile or, in other words, for enforcing the rules selected by the user. Upon receiving this input, the security application 13 changes the security configuration of the computer system 12 such that the computer system 12 begins enforcing the selected rules. In other words, the security profile selected by the system administrator is activated.

More specifically, the security application 13, in response to the activation request, is configured to change the machine state of the computer system 12 such that the selected rules are enforced by the operating system 16 during operation of the system 12. As known in the art, the machine state of a computer system 12 refers to mathematical values stored within the computer system 12 that indicate the computer system's current status. As an example, the machine state includes, but is not limited to, the values of the computer system's flags, registers, and counters. Some of the values of the machine state pertain to and control security within the computer system 12.

For example, one of the registers (not shown) within the computer system 12 may include a value or a flag indicative of whether any access restrictions to a particular application 14 or file 15 exist. When the system administrator has selected, via security application 13, a rule for restricting access to this particular application 14 or file 15, the security application 13, upon activation, changes the foregoing value within the register such that the value indicates that access to the particular application 14 or file 15 has been restricted. The security application 13 may also store in the register or other location data indicative of which users are authorized to access the application 14 or file 15 or indicative of which users are restricted from accessing the application 14 or file 15.

Before invoking or retrieving the particular application 14 or file 15, the operating system 16 analyzes the foregoing register to determine whether or not to access the particular application 14 or file 15. If the register indicates that access is not restricted, then the operating system 16 invokes or retrieves the application 14 or file 15. However, if the register indicates that access is restricted, then the operating system 16 takes further steps to determine whether or not the requesting user is authorized to access the application 14 or file 15. More specifically, the operating system 16 analyzes the data previously stored by the security application 13 that indicates which users are authorized to access or prevented from accessing the particular application 14 or file 15, and based on this data, the operating system 16 either accesses or refrains from accessing the particular application 14 or file 15.

Note that in the foregoing example, the security application 13 performs no functionality once the machine state and, more particularly, the security configuration is set by the security application 13. In this regard, the security application 13 merely sets the machine state of the computer system 12 such that the operating system 16, via normal operation, enforces the rule selected for enforcement.

Furthermore, the foregoing example is presented for illustrative purposes. The enforceability of various other rules may be controlled by controlling the machine state according to various other techniques. Such techniques are well-known in the art and will not be described in detail herein.

After the system administrator selects and activates a security profile, the system administrator may decide to change the security profile. In this regard, the system administrator may invoke the security application 13 and then select an option for modifying the current security profile. In response, the security application 13 displays to the system administrator the list of security rules that are presently being enforced and the list of security rules that are presently not being enforced. The system administrator then selects, via input device 31, which of these rules to add to the security profile and/or which of these rules to remove from the security profile. Then, the system administrator inputs an activation request to activate the security profile, as changed by the system administrator. In response, the security application 13 changes the machine state of the computer system 12 as necessary in order to implement the security profile, as changed by the system administrator. In other words, the security application activates a new security profile.

After activation of a security profile, a user not authorized to make changes to the security profile may attempt to change the security settings or, in other words, the security configuration of the computer system 12 (i.e., the settings of the machine state that affect whether one or more of the rules defined by the security application 13 is enforced). If successful, the user will alter the security profile of the computer system. This may compromise the security of the computer system 12 and/or make the operation of the computer system 12 less compatible.

In the present invention, a security application is designed to detect when a user has made an unauthorized change to the security settings within a computer system. When a change is detected, the security application modifies the security settings in order to return the security profile back to its original state before the unauthorized change was made. The security application then alerts the system administrator of the unauthorized change.

Figure 2:
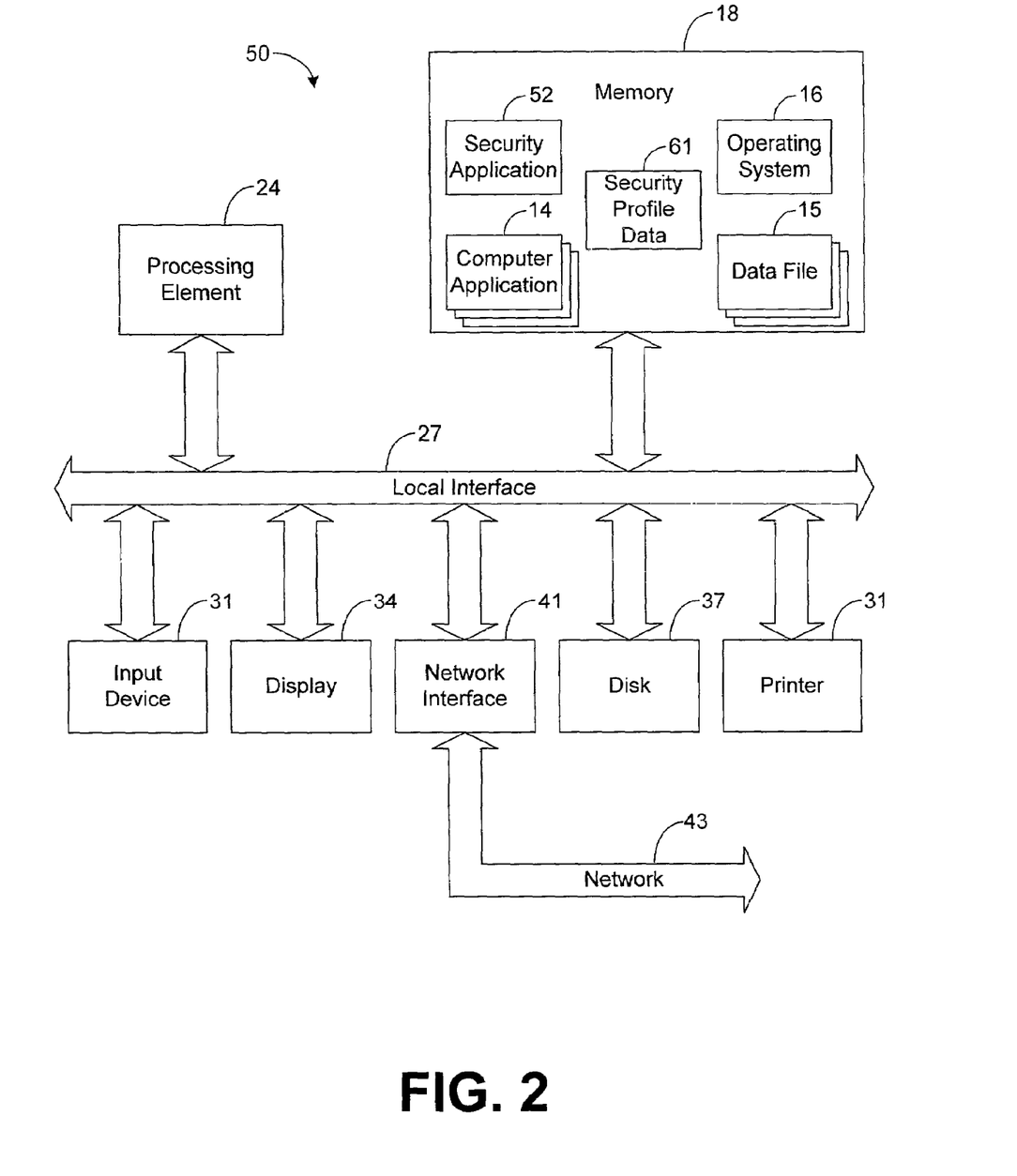
FIG. 2 is a block diagram illustrating a computer system employing a security application in accordance with the principles of the present invention.

FIG. 2 depicts a computer system 50 that may be employed to implement the present invention. Similar to conventional computer system 12, system 50 includes one or more computer applications 14 and data files 15 stored in memory 18 along with an operating system 16. The operating system 16 via conventional techniques controls the operation and the resources of the system 16 and, in particular, controls the interfacing of instructions with a processing element 24.

The system 50 also includes a security application 52 configured in accordance with the principles of the present invention. The security application 52 can be implemented in software, hardware, or a combination thereof. In the preferred embodiment, as illustrated by way of example in FIG. 2, the security application 52 of the present invention along with its associated methodology is implemented in software and stored in memory 18.

Note that the security application 52, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the security application 52 may be magnetically stored and transported on a conventional portable computer diskette.

As in conventional computer system 12, the processing element 24 of the system 50 may communicate to and drive the other elements within the system 50 via a local interface 27, which can include one or more buses. Furthermore, an input device 31, for example, a keyboard or a mouse, can be used to input data from a user of the system 50, and an output device 34, such as screen display or a printer, can be used to output data to the user. A disk storage mechanism 37 can be connected to the local interface 27 to transfer data to and from a nonvolatile disk (e.g., magnetic, optical, etc.). The system 50 can be connected to a network interface 41 that allows the system 50 to exchange data with a network 43.

Similar to conventional security application 13, the security application 52 includes data that defines a list of security rules for preventing access and/or modification of certain applications 14, data files 15, and/or other resources within the computer system 12. The list of rules defined by the security application 52 may be the same list of rules defined by conventional security application 13. When invoked, the security application 52 provides a list of options, via output device 34, to the user of the system 50. The user that initially invokes the security application 52 is considered to be a system administrator.

To enable selection of a security profile, the security application 52 displays, via output device 34, the list of security rules defined by the security application 52. The list of rules may be categorized as taught in copending U.S. Patent Application entitled, "System and Method for Categorizing Security Profile Rules within a Computer System," filed on even date herewith, and assigned Ser. No 09/760,236, which is incorporated herein by reference. Similar to conventional system 12, the system administrator, via input device 31, selects which rules should be enforced and which rules should not be enforced upon activation of the security profile being defined by the system administrator. In other words, the system administrator enables and disables the rules as desired by the system administrator.

After each desired security rule has been appropriately enabled or disabled, the system administrator inputs, via input device 31, an activation request for activating the security profile being defined by the system administrator. In response, the security application 52 modifies the security settings of the computer system 50 such that the enabled security rules are enforced by the computer system 50 (e.g., by operating system 16) during any subsequent operation until the security profile is later changed. The techniques used to update the security settings should be similar to the techniques employed by conventional security application 13 in updating the security settings of conventional system 12.

As described above, once the rules have been appropriately enabled or disabled (i.e., once the security profile has been defined), the system administrator inputs an activation request for activating the security profile defined by the enabled rules of security application 52. In response, the foregoing security profile is activated. During the activation, the security application 52 modifies the security settings of the system 50 such that the security rules enabled at the time of the activation are enforced and such that the rules disabled at the time of the activation are not enforced.

Also in response to the foregoing activation request, the security application 52 stores a set of security profile data 61 into memory 18. The set of security profile data 61 is indicative of which security rules are enabled and which rules are disabled at the time of the activation, and it is, therefore, possible for the security rules enabled during activation to be identified by analyzing the foregoing set of security profile data 61. In the preferred embodiment, the enforceability of the security rules is controlled by the status of the machine state and, more particularly, the security settings of the system 50. Thus, the security profile data 61 is indicative of the state of the security settings during activation.

In this regard, the security profile data 61 is indicative of each machine state value that may be controlled based on whether or not any one of the rules defined by the security application 52 is enabled or disabled upon activation. Therefore, at any point in the future, the security profile data 61 may be utilized to set the machine state of the computer system 50 such that the security rules enabled at the time of activation are enforceable and such that the security rules disabled at the time of the activation are not enforceable. In other words, the security profile data 61 may be utilized to return the security profile to its original activation state. Note that the security profile data 61 may be identical to or similar to the security profile data described in U.S. Patent Application entitled "System and Method for Recovering a Security Profile of a Computer System," filed on even date herewith, and assigned Ser. No. 09/760,404, which is incorporated herein by reference.

After activation of the security profile, referred to hereafter as the "original security profile," the security application 52 periodically checks the value of each security setting within computer system 50 to ensure that each security setting has not changed since activation and, therefore, to ensure that a different security profile is not being implemented by the computer system 50. This may be achieved by comparing the security setting to the data within security profile data 61 that was stored during activation of the original security profile. If the security application 52 determines that the security setting has changed since activation, then it is likely that the security setting has been changed by a user who is not authorized to make the change Therefore, upon the detection of such a changed security setting, the security application 52, based on the security profile data 61, changes the security setting to its original state that existed at the time of activation. By ensuring that the security settings maintain their original activation states, the security application 52 ensures that the computer system 50 continues implementation of the original security profile.

Furthermore, the security application 52 preferably stores in memory 18 data defining one or more addresses of one or more users that should be notified when an unauthorized change to a security setting is detected by the security application 52. In response to a detection of an unauthorized security setting change, the security application 52 preferably transmits a message (e.g., an e-mail message) to each of the foregoing addresses. The message preferably includes information indicating that an unauthorized change to the system's security settings has been detected and preferably includes detailed information about the unauthorized change (e.g., which setting was changed, when the setting was changed, who changed the setting, etc.), if such detailed information is available. Thus, the users that receive the message should be aware that an unauthorized change occurred and may decide to take steps to better ensure the security of the system 50.

At some point, the system administrator may desire to change the security profile of the computer system 50. When this occurs, the security application 52 allows the system administrator to define a new security profile according to the techniques described hereinabove. In this regard, the security application 52 lists each rule that the system administrator may select for enforcement (i.e., enable). Once the system administrator has enabled each rule to be enforced via the new security profile, the system administrator provides a request to activate the new security profile. In response, the security application 52 activates the new security profile according to the techniques described hereinabove.

More specifically, the security application 52 changes the security settings such that the computer system 50 now implements the new security profile. Furthermore, the security application 52 stops checking the security settings based on the previously described security profile data 61 (i.e., the security profile data 61 stored in response to the activation of the original security profile). Instead, the security application 52 stores new security profile data 61 indicative of the security settings of the system 50 upon activation of the new security profile. The security application 52 then periodically checks each security setting to ensure that each security setting maintains the same state that existed upon activation of the new security profile. Therefore, through the foregoing techniques, the security application 52 ensures that any changes to the security settings since the most recent security profile activation are automatically detected and corrected.

OPERATION

The preferred use and operation of the security application 52 and associated methodology are described hereafter.

Figure 3:
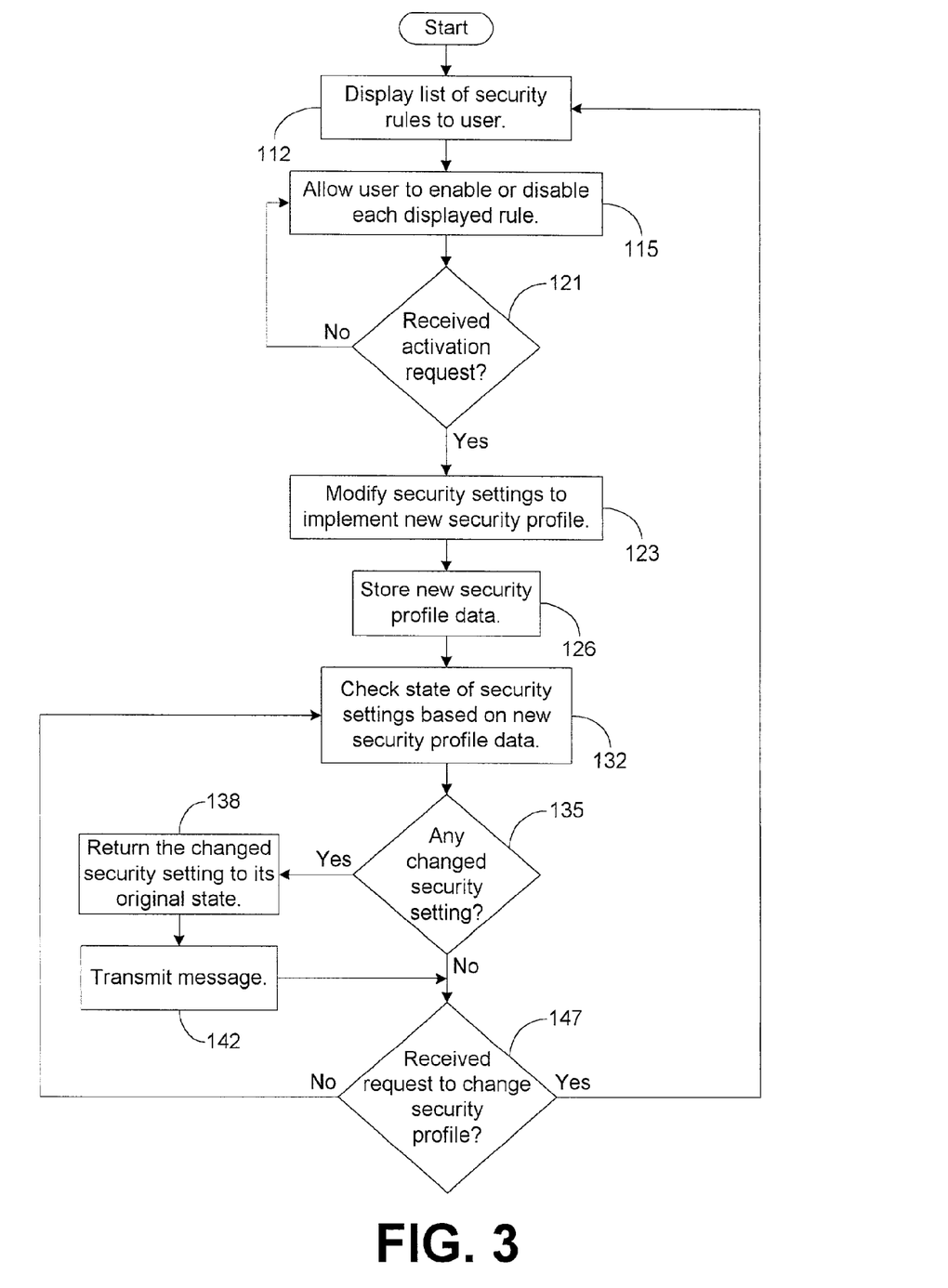
FIG. 3 is a flow chart illustrating the architecture and functionality of the security application depicted in FIG. 2.

Initially, the system administrator invokes the security application 52, which displays, via output device 34, a list of security rules to the system administrator in block 112 of FIG. 3. The security application 52 then allows the system administrator to enable or disable each of the displayed rules, as shown by block 115. The system administrator may manually enable each rule that is to be enforced and may manually disable each rule that is not to be enforced. Alternatively, at least some of the rules to be enforced may be enabled or disabled by default. If the rules are enabled or disabled by default, the system administrator may have the option to manually change whether one or more of the rules is selected for enforcement or, in other words, is enabled.

After enabling or disabling the rules as desired, the system administrator submits an activation request to indicate that the rules enabled via block 115 should be enforced by the system 50. In response, the security application 52 modifies the security settings of the system 50 such that the rules enabled in block 115 are enforced by the system 50, as shown by blocks 121 and 123. Once the security settings have been modified by the security application 52, the security application 52 stores a set of security profile data 61 into memory 18, as shown by block 126. This set of security profile data 61 is indicative of the original security settings (i.e., the security settings as just modified via block 123) of the computer system 50.

Subsequent to block 123, the computer system 50 and, in particular, the operating system 16 processes data based on the machine state of the system 50, including the security settings modified in block 123. During operation of the system 50, the security application periodically compares, in block 132, each security setting of the computer system 50 to the security profile data 61 stored via block 126 in order to determine whether any of the security settings have changed since block 123. If the security application 52 detects that a security setting has changed since block 123, then the security application 52 changes the security setting back to its original state (i.e., the state set in block 123), as shown by blocks 135 and 138. In addition, the security application 52 also transmits a message to the system administrator indicating that the security application 52 detected a modification of one of the security settings, as shown by block 142.

When the system administrator desires to change the security profile of the computer system 50, the system administrator inputs a request to change the security profile. Such a request is detected in block 147, and the foregoing process is repeated. Once the process for changing to a new security process is initiated via block 147, it is no longer necessary for the security application 52 to continue analyzing the security settings based on the security profile data 61 previously stored in block 126.

By implementing the foregoing techniques, any unauthorized change to a security setting is automatically detected and corrected by the security application 52, and the system administrator may be informed of each unauthorized change detected by the security application 52. Note that it is not necessary for the security application 52 to perform both the correcting step and the notifying step. In this regard, either step 138 or 142 may be eliminated. If step 138 is eliminated, then the security application 52 will merely inform the system administrator of a detected change to the security settings. The system administrator may then take steps to manually correct for the change, if desired. If step 142 is eliminated, then the security application 52 will correct for any unauthorized change to the security settings, but the system administrator will not be notified of any such detected change It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A computer system, comprising:
memory; and
a security application configured display a list of security rules to a user and to enable ones of said security rules based on user inputs, said security application configured to lock down resources of said computer system by modifying security settings of said computer system based on which of said security rules are enabled when an activation request is received by said computer system, said security application configured to store, in said memory, data indicative of said security settings, said security application configured to perform comparisons between said data and said security settings and to determine when one of said security settings has changed from a first value to another value based on one of said comparisons, said security application further configured to change said one security setting to said first value in response to said one comparison.

2. The system of claim 1, wherein said security application is further configured to transmit a message indicating that said one security setting has changed in response to said one comparison.

3. The system of claim 1, wherein said security application is further configured to store said data in response to said activation request.

4. The system of claim 1, wherein said security application is further configured to periodically compare each of said security settings to said data.

5. A system for locking down resources of computer systems, comprising:
means for receiving a request for activating a security profile;
means for modifying security settings of a computer system in response to said request;
means for storing data indicative of said modified security settings;
means for automatically determining when one of said security settings has changed from a first value to another value by periodically comparing said data to said security settings; and
means for automatically changing said one security setting to said first value in response to a determination by said determining means that said one security setting has changed.

6. The system of claim 5, wherein said system further comprises:
means for automatically transmitting, in response to said determination, a message indicating that said one setting has changed.

7. The system of claim 5, wherein said storing means is configured to store said data in response to said request.

8. A method for locking down resources of computer systems, comprising:
receiving a request for activating a security profile;
modifying security settings of a computer system in response to said request;
storing data indicative of said security settings, as modified by said modifying;
automatically determining when one of said security settings has changed from a first value to another value by periodically comparing said data to said security settings; and
automatically changing said one security setting to said first value in response to a determination in said determining that said one security setting has changed.

9. The method of claim 8, further comprising:
automatically transmitting, in response to said determination, a message indicating that said one security setting has changed.

10. The method of claim 8, wherein said storing is performed in response to said request.

11. The system of claim 1, wherein said security application is configured to change said one security setting in response to said one comparison without changing another of said security settings in response to said one comparison.

12. The system of claim 1, further comprising an operating system configured to analyze said one security setting to determine whether access to a resource of said computer system is restricted.

13. The computer system of claim 12, wherein said one security setting is associated with one of said security rules, and wherein said operating system is configured to enforce said one security rule based on said one security setting.

14. The computer system of claim 13, wherein said security application is not configured to enforce said one security rule.

15. The computer system of claim 12, wherein said security settings are within a machine state analyzed by said operating system for selectively enforcing said security rules.

16. The computer system of claim 15, wherein said data is separate from said machine state and is stored in said memory by said security application in response to said activation request.

17. The computer system of claim 16, wherein said one security setting is a flag associated with said resource.

18. The system of claim 5, further comprising an operating system configured to analyze said one security setting to determine whether access to a resource of a computer system is restricted.

19. The method of claim 8, wherein said one security setting is analyzed by an operating system of said computer system in order to control access to a resource of said computer system.

20. A computer system, comprising: memory;
an operating system configured to analyze a machine state to control operation of said computer system, said machine state including a security setting associated with a resource of said computer system and indicating whether access to said resource is restricted, wherein said operating system is configured to analyze said security setting to control access to said resource; and a security application configured to modify said security setting based on a user input and to store, in said memory, data indicative of a state of said security setting, as modified by said security application, said security application configured to perform a comparison between said data and said security setting to detect an unauthorized change of said security setting, said security application further configured to automatically change said security setting based on said data in response to a detection of an unauthorized change of said security setting.

21. The computer system of claim 20, wherein said security application is configured to set said security setting based on said user input in response to a user activation request.

22. The computer system of claim 21, wherein said security application is configured to store said data in said memory in response to said user activation request.

23. The computer system of claim 20, wherein said security setting is a flag stored within a register.

24. The computer system of claim 20, wherein said security application is further configured to transmit, in response to said detection, a message indicating that said one security setting has changed.

* * * * *